Dec. 19, 1961     J. W. FRAZER     3,013,953
PROCESS FOR SEPARATING AZEOTROPIC MIXTURES
BY EXTRACTIVE AND CONVECTIVE DISTILLATION
Filed Oct. 13, 1958
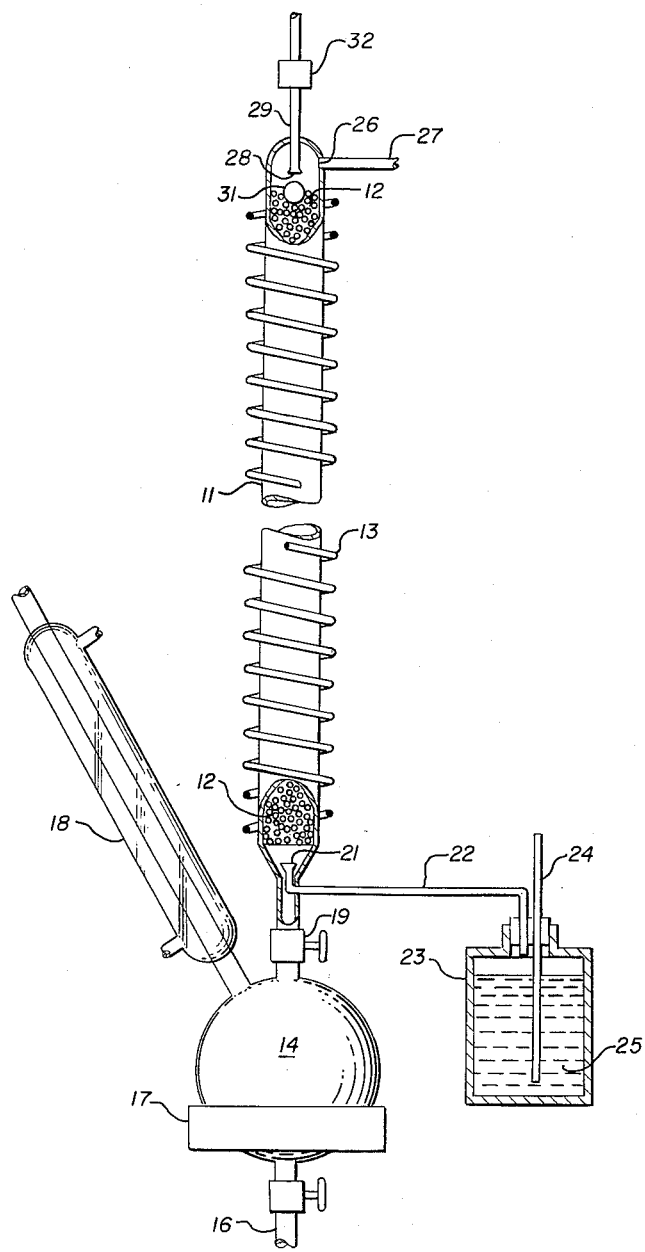
INVENTOR.
JACK W. FRAZER
BY
*Roland A. Anderson*
ATTORNEY

United States Patent Office 3,013,953
Patented Dec. 19, 1961

3,013,953
PROCESS FOR SEPARATING AZEOTROPIC MIXTURES BY EXTRACTIVE AND CONVECTIVE DISTILLATION
Jack W. Frazer, Livermore, Calif., assignor to the United States of America as represented by the United States Atomic Energy Commission
Filed Oct. 13, 1958, Ser. No. 767,068
3 Claims. (Cl. 202—39.5)

This invention relates in general to a method for separating liquids. More specifically, it relates to a method for separating mixtures of liquids, particularly azeotropes and other mixtures of liquids with nearly the same boiling points, by taking advantage of the changes in vapor pressures of the liquids upon addition of a liquid solvent thereto.

The invention provides a method for separating the vapors of liquids forming constant boiling or nearly constant boiling mixtures. To do this the liquid mixture or vapors thereof are introduced into a column in which a solvent liquid is flowing downward countercurrent to an inert gas. Preferably the column is heated to a temperature somewhat above the boiling point of the mixture or of the lower boiling constituent although lower temperatures may be used where advantageous. The less volatile constituent tends to become enriched within the solvent and the more volatile constituent tends to become enriched within the inert gas. Complete separation may be obtained.

In the prior art the separation of liquids forming constant boiling mixtures or having very nearly the same vapor pressures and boiling points has been approached by a number of methods. The method selected generally depends upon the particular liquids it is desired to separate and also upon other process conditions. Simple distillation and solvent extraction are common methods used. When the liquids are azeotropes extractive distillation, distillation at a modified pressure or gas chromatography may be necessary. Each of these common methods involves certain disadvantages, except of course distillation in a fractionating column, which is usually not feasible with close boiling liquids. Solvent extraction entails subsequent separation of the extractant and solvent, and in fact a satisfactory solvent may not always be known for certain azeotropes. Extractive distillation involves similar problems. Gas chromatography has the inconvenience of batches and generally small amounts and rather lengthy separation times.

There has now been discovered a method of separating liquids, particularly azeotropes and other close boiling liquids, which is susceptible to continuous operations. The method makes use of a vertical column heated to a temperature preferably somewhat higher than the boiling point of the mixture or lower boiling constituent although lower temperatures may also be used. An inert carrier gas is made to flow upward countercurrent to a suitable solvent flowing downward. The mixture to be separated is continuously admitted, preferably near the base of the column and as a constituent of the carrier gas. Upon contact and dissolution within the solvent the relative vapor pressures of the two or more components become altered; upon revaporization one component has a higher vapor pressure, and hence is more volatile and is present in the gas phase in a greater amount than previously. Thereafter the inert carrier gas passing upward is enriched in the liquid component having the lower boiling point or solubility and the higher vapor pressure, while the solvent passing downward is enriched in the constituent with the higher boiling point or solubility and the lower vapor pressure. As the gas carrier proceeds up the column less and less of the less volatile constituent is present.

The method has particular utility with mixtures containing a component which undergoes decomposition at its boiling point or which for some other reason cannot be distilled or extracted. The speed of separation and volume of throughput per relative size and cost of equipment also compares favorably with other methods, even for the separation of non-azeotropes. The two fractions and the components therein may be recovered by conventional methods.

Accordingly, an object of the invention is to provide a method for separating liquids and liquid mixtures, particularly azeotropes and close boiling liquids.

A further object of the invention is to provide a method for separating certain liquid mixtures continuously and quickly, with a minimum energy requirement.

Another object of the invention is to provide a method for separating liquid mixtures without raising the temperature of the liquids to their boiling points.

Another object of the invention is to provide a method for separating liquid mixtures, the constituents of which have nearly the same vapor pressures, by taking advantage of the change in vapor pressure upon addition of a solvent.

Another object of the invention is to provide a method for separating mixtures of constant boiling liquids in a four component gas-liquid extraction process employing a thermal equilibrium column.

Further objects and advantages of the invention will become apparent upon consideration of the following description, examples and a single figure of a side view, partly in cross section, of the preferred embodiment of the apparatus used for the subject method.

In the practice of the invention there will first be provided an azeotrope or other liquid mixture to be separated, a solvent, an inert carrier gas and equipment to be described hereinafter. The azeotrope or liquid mixture is not limited to any particular class of liquids or to particular properties, except that the vapor pressures of the constituents which are to be separated must differ when a selected solvent is added thereto. Most frequently the liquids will all be organic materials. Impurities and third components may be present.

As with extractive distillation, the suitability of a solvent depends on its effect on the volatility of the components to be separated and on certain other factors mentioned below. It is usually advantageous to select a solvent which augments the normal vapor-pressure relationships and which forms a highly non-ideal system. In addition, the solvent should be sufficiently high boiling that the components obtained in the solvent phase can be easily recovered by fractional distillation. It should also be a good solvent for the less volatile component so that excessive quantities of solvent are not necessary and solvent-phase separation will not occur. Should such separation occur, much of the relative volatility enhancement is lost. The solvent should be thermally stable so that no decomposition occurs during distillation for removal of components dissolved in the solvent. For purposes of the invention as described, the solvent should not form an azeotrope with the other components. In general, the solvents will be the same as those used in extractive distillation. These conventional solvents are so numerous in number and include species in so many classes of liquids that a wide choice will be available for each mixture to be separated.

The inert carrier gas serves only the function of transporting the gaseous products upward through the column and hence no particular gas is preferred. In practice helium has been used satisfactorily.

In the practice of the invention there will generally be provided a thermal equilibrium column in which the solvent selected flows downward by gravity and in which the carrier gas flows countercurrent upward. No particular temperature is specified to achieve separations, but optimum separation is attained at temperatures above the boiling point of the mixtures. Upon introduction to the column of the mixture to be separated and contact with the liquid solvent and carrier gas the relative vapor pressures of the components are altered. The gas carrier containing vapors re-vaporized from the solvent is thereafter enriched in the more volatile component and the liquid is correspondingly enriched in the less volatile component. The enriched gas flows upward with further absorption or condensation into, and vaporization from, fresh solvent with consequent further enrichment, as in extractive distillation, whereby more of the less volatile component is continuously carried downward and more of the more volatile component is continually carried upward in the carrier gas.

In the selection of apparatus to carry out the process modifications of equipment generally available for fractional distillation may be conveniently employed. However, the invention is not limited thereby and it will be apparent to those skilled in the art that numerous variations and modifications may be made within the spirit and scope of the invention. A typical embodiment is provided in the accompanying figure wherein there is shown a fractionating column 11 packed with beads 12 and heated by an exterior resistance heater 13 wound about the column to produce uniform temperature distribution along the entire column length. The column 11 terminates downwardly in a removable flask or container 14 to which there may also be optionally connected a fixed drain 16, a heating means 17 and a reflux distillation column 18. A valve 19 closes flow to the fractionation column 11 when the distillation column 18 is being used. Inlet 21 near the bottom of column 11 is provided for introduction of the azeotrope and carrier gas mixture through inlet tube 22. The azeotrope may be conveniently added to the inert carrier gas by means of a bubble flask 23 in which inert gas from an exterior source (not shown) is bubbled through tube 24 into an amount of said azeotrope or liquid mixture 25 contained in said flask 23, inlet tube 22 being connected to the portion of said flask 23 above the liquid surface. An outlet 26 near the top of column 11 provides exit means from which gases are transported through pipe 27 to a conventional cold trap (not shown) wherein organic vapors are condensed. Inlet 28 at the top of column 11 with connecting inlet tube 29 is also provided for metering in a solvent at a uniform or intermittent rate. Rate of admittance of the solvent may be controlled by photoelectric cell 31 viewing the top of the column to operate a conventional solenoid valve 32 by conventional means when the column solvent is low, thereby admitting solvent from a pressure feed source (not shown). While other means of introducing solvent may be used, the use of photoelectric cell 31 effectively maintains a constant solvent level in the column.

In the operation of the process the azeotrope mixture to be separated is placed in the bubble flask 23 and heated by external means, if desired, in order to insure complete saturation of the carrier gas flowing therethrough. The column is heated to a temperature preferably above the normal boiling points of the components or the boiling temperature of the constant boiling mixture as stated hereinbefore. In the preferred embodiment as shown the column is resistance wire wrapped for constant temperature, but a temperature gradient rising from bottom to top may be used if desired. The solvent, selected according to criteria set forth hereinbefore, is fed into the top of the column at a rate which, adjusted together with the column temperature and rate of carrier gas feed, is sufficient to obtain separation of the mixture without column flooding. Maximal rates and temperatures may be determined empirically for any given mixture. The lighter boiling component is taken off with the carrier gas and may be cold trapped at the top of the column, while the lower boiling component is recovered with the solvent at the bottom, from which it may be recovered by distillation. If desired the bottom fraction may be recycled to further recover remaining amounts of the more volatile components.

Various modifications may be desirable. For example, the invention has been described for use with a binary azeotrope, but it can be used with an azeotrope with additional components as well. For a column which has the equivalent of many theoretical plates, e.g., 10–20, a separation of above 99% can be obtained using ordinary techniques. This applies to all common azeotrope gas and liquid mixtures in which a suitable solvent is selected.

EXAMPLE I

Helium carrier gas was saturated with an azeotrope mixture giving a spectrographic analysis of 1,1,2,2 tetrafluorodinitroethane (TFDNE), $C_2F_4(NO_2)_2$, 71.5 mole percent, carbon tetrachloride 27.7 mole percent, air, 0.3 mole percent and other, 0.5 mole percent, by passing the helium through a bubble flask containing the azeotrope. 1,1,2,2 tetrafluorodinitroethane may be prepared by the method taught in U.S. Patent No. 2,447,504 (1948), Hess and Whitaker. A method of preparation is also taught by I. L. Knunyants & A. V. Fokin, Doklady Akad Nauk, USSR III 1035–8 (1956) (Russian), CA 51, 19472h (1957). The composition has desirable insecticidal properties and in addition, because of its obvious high energy content and other properties, it is interesting as a propellant and as an explosive oxidizer. The boiling point of the azeotrope is approximately 62° C.

The saturated helium was forced into the bottom of a heated glass column, 1.2 in. diameter and 36 in. high, packed with ⅛ in. diameter glass beads, at a predetermined flow rate and collected at an outlet near the top. Simultaneously, an extraction solvent, di-n-butyl-phthalate, was continuously metered into the top of the column and allowed to collect in a reservoir into which the column bottomed out. This phase contained the carbon tetrachloride and part of the 1,1,2,2 tetrafluorodinitroethane, while most of the latter was carried by the carrier gas and subsequently recovered in a liquid nitrogen cold trap. The total sample amounted to 30 grams which was separated in five runs. In all respects the equipment corresponded to that described hereinbefore as the preferred embodiment. The variables for each run, together with analysis of the top and bottom fractions, are tabulated below. It will be seen that excellent separation was obtained.

*1,1,2,2-tetrafluorodinitroethane-carbon tetrachloride separation data using gas-liquid counterflow extraction*

|  | 1 | 2 | 3 | 4 | 5 |
|---|---|---|---|---|---|
| 1,1,2,2,tetraffuoro-1,2 dinitroethane in starting material, mole percent | 71.5 | 71.5 | 71.5 | 69 | 71.5 |
| Helium flow rate, cc./min | 110 | 110 | 110 | 220 | 110 |
| Di-n-butylphthalate flow rate (cc./min.) | 7.3 | 9.4 | 14.3 | 6.8 | 4.2 |
| Temperature, ° C., of column | 135 | 135 | 135 | 70 | 70 |
| Temperature, ° C., saturator | 60 | 60 | 60 | 59 | 59 |
| Total Extraction time, min | 44 | 55 | 52 | 58 | 111 |
| 1,1,2,2,tetrafluoro 1,2 dinitroethane recovered in gas fraction, percent | 67 | 83 | 42 | 20 | 10 |
| Purity of tetraffuoro 1,2 dinitroethane recovered in gas fraction, mole percent | 99 | 99.94 | 99.8 | 99.65 | 99.7 |

EXAMPLE II

Azeotropic solutions of butane-ethane, ethanol-water, and ethanol-carbon tetrachloride were made up in batches of approximately 20 grams each. In a series of separate runs helium carrier gas saturated with vapors from each of the aforenamed azeotropes was subjected to the process of Example I using identical equipment and di-n-butyl-phthalate solvent. Rates and temperatures were adjusted upward until a few milliliters of product were obtained in the cold trap, but conditions were not accurately controlled and no effort was made to attain optimum conditions. The trap contents were analyzed for each of the constituents by spectrographic analysis. In each of the three runs a substantially pure fraction of the lighter boiling component of the azeotrope was obtained.

While there has been described in the foregoing what may be considered to be preferred embodiments of the invention, modifications may be made therein without departing from the spirit of the invention and it is intended to cover all such as fall within the scope of the appended claims.

What is claimed is:

1. The method for separating and recovering the components of an azeotropic mixture, comprising the steps of heating a 30 mm. diameter fractionating column by external means to a temperature of 135° C., bubbling helium into an azeotrope of carbon tetrachloride and 1,1,2,2-tetrafluoro 1,2 dinitroethane and impurities at 60° C., introducing said helium gas containing said azeotropic vapors into said column at a flow rate of 110 cc. per minute, whereby said gas flows upward toward an outlet, metering di-n-butylphthalate solvent into said column above said gas inlet at a rate lower than that which causes flooding of said column, whereby said solvent flows downward in contacting relation with said gas, and whereby said 1,1,2,2 tetrafluoro 1,2 dinitroethane is carried out of the top of said column in said gas stream, and said carbon tetrachloride emerges from the bottom of said column in said solvent, and recovering said 1,1,2,2 tetrafluoro 1,2 dinitroethane from said gas stream by condensation in a liquid nitrogen trap.

2. The method for separating and recovering the components of an azeotropic mixture including at least carbon tetrachloride and 1,1,2,2-tetrafluoro 1,2 dinitroethane comprising the steps of introducing said azeotrope in vapor form into the base of a fractionating column together with an inert gas, maintaining said column at a temperature of about 135° C., metering di-n-butylphthalate solvent into said column above said gas inlet at a rate lower than that which causes flooding of said column, and recovering said carbon tetrachloride at the bottom of said column in said solvent and recovering said 1,1,2,2-tetrafluoro 1,2 dinitroethane from said gas at the top of said column.

3. The method of separating and recovering carbon tetrachloride and 1,1,2,2-tetrafluoro 1,2 dinitroethane from a constant boiling or nearly constant boiling liquid mixture thereof comprising the steps of heating a thermal equilibrium column to a temperature at least approaching the boiling point of said liquid mixture, introducing an inert carrier gas containing gaseous components of said constant boiling liquid mixture into the base of said column, whereby said gas flows towards an outlet at the upper end thereof, feeding di-n-butylphthalate liquid solvent into said column at a point above said gas inlet, whereby said gas and said liquid solvent are in countercurrent contacting relationship, and whereby said upward moving gaseous phase is enriched in 1,1,2,2-tetrafluoro-1,2 dinitroethane and said downward moving liquid phase is enriched in carbon tetrachloride, and collecting said 1,1,2,2-tetrafluoro 1,2 dinitroethane and said carbon tetrachloride fractions at the top and bottom of said column respectively.

References Cited in the file of this patent
UNITED STATES PATENTS

| | | |
|---|---|---|
| 2,621,808 | Blakeney | Dec. 16, 1952 |
| 2,782,148 | Geiger | Feb. 19, 1957 |
| 2,855,344 | Galvin | Oct. 7, 1958 |

OTHER REFERENCES

Horsley: "Azeotropic Data," pub. 1952 by American Chemical Society, Wash., D.C., pages 6 and 15 relied upon.

Weissberger: "Distillation," 1951 (pp. 317–321).